D. OLSON.
BEET PULLER AND TOPPER.
APPLICATION FILED JUNE 30, 1913.
1,094,742.
Patented Apr. 28, 1914.
3 SHEETS—SHEET 1.
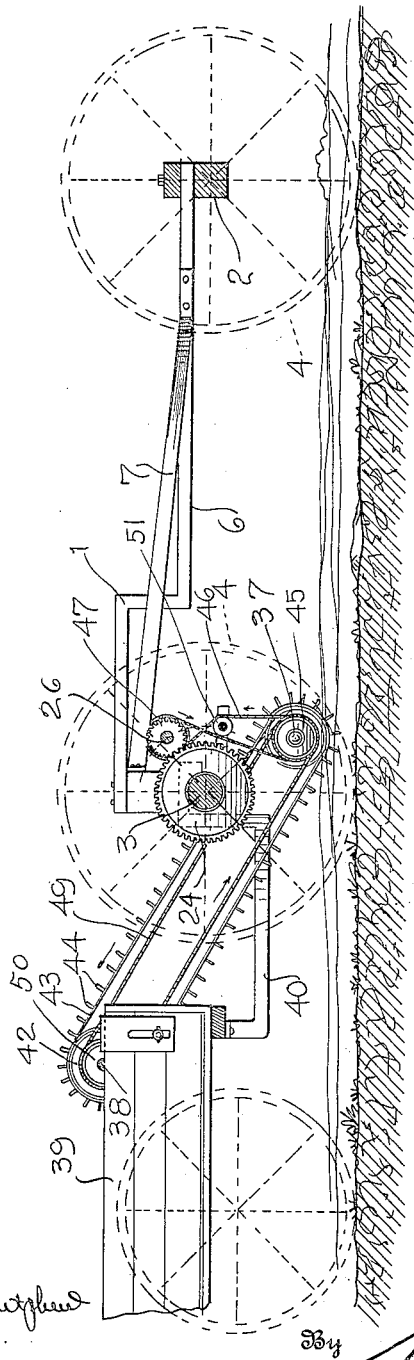
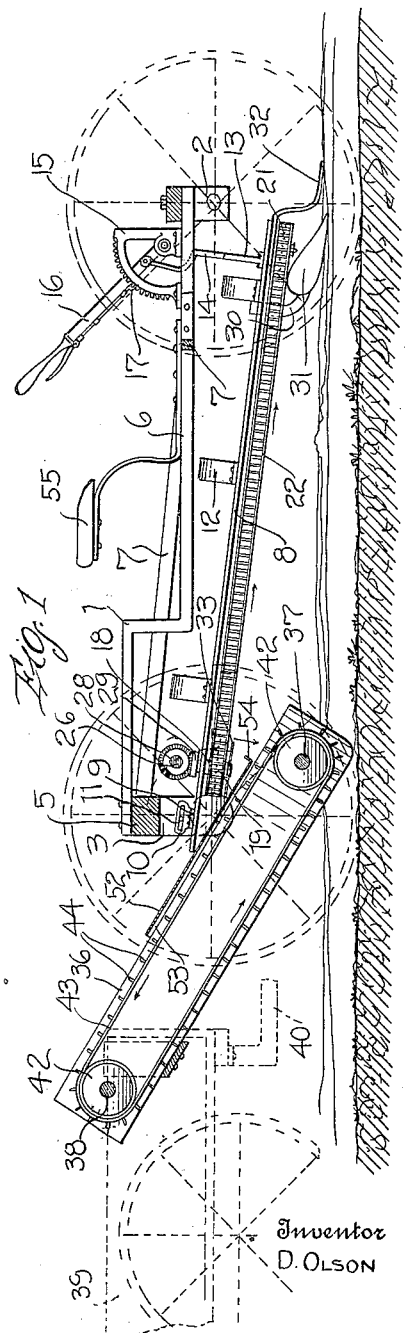
Inventor
D. Olson
By Watson E. Coleman
Attorney

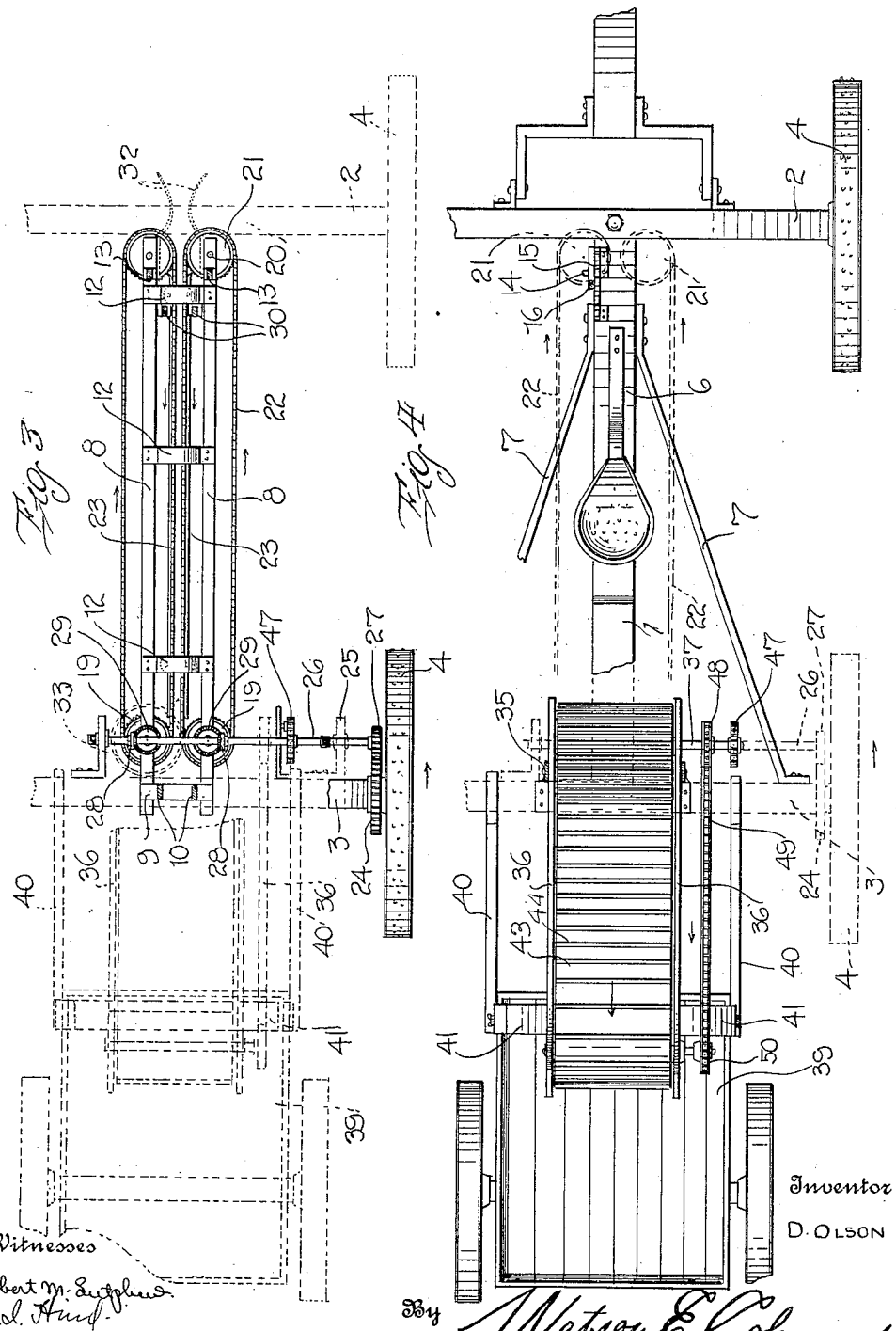

D. OLSON.
BEET PULLER AND TOPPER.
APPLICATION FILED JUNE 30, 1913.
1,094,742.
Patented Apr. 28, 1914.
3 SHEETS—SHEET 3.
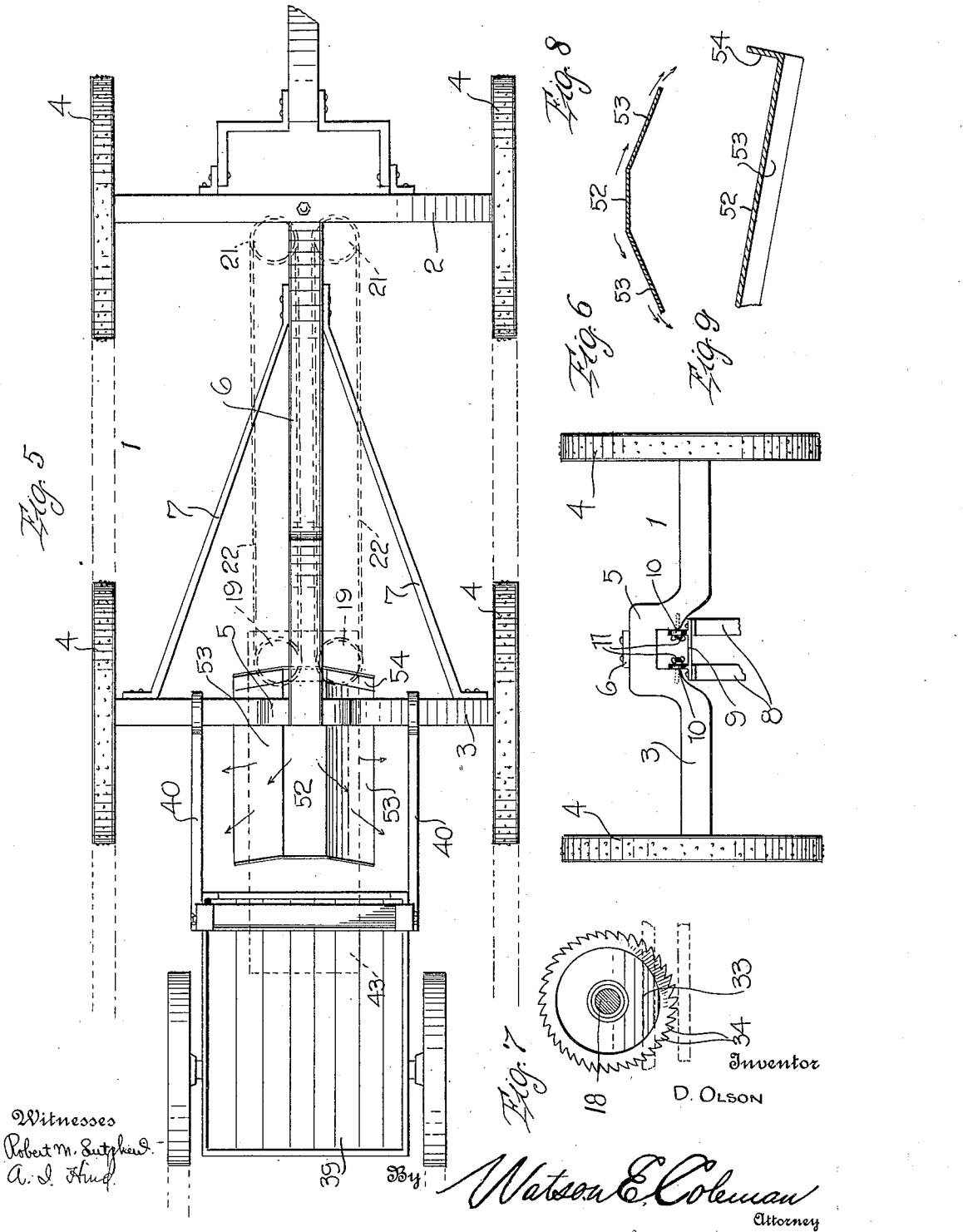
Witnesses
Robert M. Sutphen
A. I. King
Inventor
D. Olson
By Watson E. Coleman
Attorney

UNITED STATES PATENT OFFICE.

DAVID OLSON, OF EL CAMPO, TEXAS.

BEET PULLER AND TOPPER.

1,094,742.　　　Specification of Letters Patent.　　Patented Apr. 28, 1914.

Application filed June 30, 1913. Serial No. 776,670.

*To all whom it may concern:*

Be it known that I, DAVID OLSON, a citizen of the United States, residing at El Campo, in the county of Wharton and State of Texas, have invented certain new and useful Improvements in Beet Pullers and Toppers, of which the following is a specification, reference being had to the accompanying drawings.

This invention relates to improvements in beet pullers and toppers, and an object thereof is the provision of a machine of this character which will pull the beets from the ground, and deposit them in a receptacle provided therefor.

Another object of this invention is the provision of a machine of this character comprising a frame in which a plow is supported, the frame also carrying a pair of endless chains connected to the supporting wheels of the machine, one end of which is disposed above the plow, the inner stretches of the chains being disposed closely adjacent each other, whereby when the beets are removed from the ground, the leaves thereof will be engaged by the endless chains and moved rearwardly in the frame.

Still another object of this invention is the provision of a beet puller comprising a frame in which a plow is supported, the frame also carrying an endless conveyer, one end of which is disposed adjacent the plow to grip the leaves of the beets as they are plowed from the ground, the frame also carrying a knife which is disposed below the endless conveyer at its rear end, the knife being adapted to cut the beets from their leaves and stems, whereupon the beets are carried by an elevator to a suitable receptacle, and the leaves and stems are discharged to the ground.

With these and other objects in view, my invention consists in the novel construction, combination and arrangement of parts, to be hereinafter more fully described, claimed and illustrated in the accompanying drawings, in which—

Figure 1 is a side elevation of the device with the frame partly in section; Fig. 2 is a side elevation partly in section with the endless conveyer removed; Fig. 3 is a top plan view partly in section showing the elevator in dotted lines; Fig. 4 is a top plan view partly in section showing the conveyer in dotted lines; Fig. 5 is a top plan view of the frame, showing the conveyer and elevator in dotted lines and the baffle plate in full lines; Fig. 6 is a rear view of the frame; Fig. 7 is a detail view of the knife. Fig. 8 is a transverse section of the baffle plate; and Fig. 9 is a fragmentary longitudinal section thereof.

Referring more particularly to the drawings, the numeral 1 designates the frame of the machine which comprises a front axle 2 and a rear axle 3 which are supported by the usual wheels 4, the rear axle 3 being arched as at 5, intermediate of its ends, the bar 6 being suitably braced by converging rods 7 which extend from the rear axle and are connected at their forward ends to the bar 6. A conveyer frame comprising a pair of longitudinally extending bars 8 is supported in the main frame, the rear ends of the bars being connected by a plate 9 which is provided with a pair of upstanding slotted ears 10, the ears being connected to the arched portion 5 of the rear axle by suitable screws 11 which project through the slots in the ears. The bars 8 are connected intermediate of their ends by arched braces 12, the bars having connected to their forward ends the forked lower end 13 of a connecting rod 14. Mounted upon the central bar 6 of the main frame above the connecting rod 14 is a rack bar 15, the upper end of the connecting bar being pivotally connected to a lever 16 which is provided with a pawl 17 for engagement with the rack bar, whereby the forward end of the conveyer frame is maintained in adjusted position. A vertically disposed shaft 18 is rotatably mounted in each of the bars 8 adjacent its lower end, the lower end of the shaft having fixed thereto a sprocket wheel 19, while the forward ends of the bars rotatably support the sprocket wheel 21. Connected to the sprocket wheels 19 and 21 are a pair of endless conveyer chains 22, the inner stretches of which are disposed closely adjacent each other. To maintain the inner stretches of the chains closely adjacent each other, plates 23 are disposed against the inner faces of the chains, and are suitably supported by the arched braces 12.

Connected to one of the rear wheels 4 of the main frame is a gear wheel 24, and supported in suitable bearings 25 which are connected to the rear axle 3, is a rotatable shaft 26, one end of which is provided with a pinion 27 meshing with the gear wheel 24. Mounted on the shaft 26 are a pair of oppositely disposed beveled gear wheels 28, which mesh with a pair of beveled gear wheels 29 which are mounted upon the upper ends of the vertical shafts 18 upon the lower ends of which the sprocket wheels 19 are mounted. Connected to the forward cross bar 12 are a pair of depending plow standards 30, to the lower end of which a plow 31 is secured, the plow extending below and slightly forwardly of the sprocket wheels 21, the plow being adapted to pull the beets out of engagement with the ground, so that they are in a position whereby the leaves and stems thereof may be grasped by the conveyer chains and moved rearwardly in the frame. Connected to the lower faces of the bars 8 at their forward extremities are a pair of offset spring arms 32, the lower end of the arms projecting forwardly and slightly above the plow 31, the arms traveling on opposite sides of the row to gather the leaves of the beets and bunch them so that all of the leaves of the beets will be passed between the chains of the conveyer. Mounted on the lower extremity of one of the shafts 18 of the sprocket wheels 19, is a circular knife 33, the edge of which is beveled and provided with a plurality of cutting teeth 34, the knife being of relatively greater diameter than the gear wheel 19 mounted on the shaft, so that the edge of the knife will span the distance between the inner spaces of the chains, and top the beets when they reach the rear end of the conveyer.

Supported below the rear axle 3 of the main frame by suitable straps 35 is the forward end of an elevator frame, the frame consisting of upwardly inclined side bars 36 which are connected at their forward and rear ends by rotatable shafts 37 and 38 respectively. The rear end of the elevator frame is supported on a cart 39 or other similar vehicle, the cart being connected to the rear axle 3 by supporting straps 40, and each of the side bars 36 is provided with an outwardly extending supporting bar 41 by means of which the upper end of the conveyer is supported above the cart 39. Connected to the shafts 37 and 38 are rollers 42 upon which is revolubly mounted an endless elevator apron 43, the outer face of which is provided with a plurality of transversely extending bars 44. The shaft 37 projects beyond one side of the elevator frame, and mounted on the projecting portion of the shaft in vertical alinement with the shaft 26 is a sprocket wheel 45, the sprocket wheel 45 being connected by a sprocket chain 46 to a suitable sprocket wheel 47 upon the drive shaft 26, whereby upon rotation of the shaft 26 and upon movement of the frame, the shaft 37 is rotated to operate the endless apron of the elevator. To distribute equal power to the rollers 42 upon the shafts 37 and 38, a second sprocket wheel 48 is mounted upon the projecting portion of the shaft 37, the sprocket wheel 48 being connected by a sprocket chain 49 to a sprocket wheel 50 which is mounted on the projecting portion of the shaft 38 in the rear end of the elevator. The chain 46 is provided with a tightener 51 of any desired construction, whereby the chain may be always maintained in tight engagement with the sprockets 47 and 45, when the conveyer frame is moved into and out of engagement with the ground.

In the practical use of my device, the main frame is drawn over the surface of the ground in any desired manner, on the supporting wheels 4 with the plow 31 in engagement with the ground and in alinement with the row of beets planted therein. Upon forward movement of the machine, the leaves and stems of the beets are gathered by the spring arms 32 in advance of the plow, and the plow raises the beets out of engagement with the ground, the leaves being caught between the inner stretches of the chains at their forward ends before the beets are entirely removed from the ground. The beets are moved rearwardly in the frame by the inner stretches of the chains which move rearwardly through the mechanism hereinbefore described, and when the beets reach the inner end of the conveyer frame, the beets are topped by the knife 33 which is disposed below the chains, whereupon the beets drop upon the elevator, the upper stretch of which moves upwardly through the mechanism upon the elevator apron by means of the transversely extending bars 44 secured to the outer face of the apron at intervals along its length. The leaves and stems of the beets are discharged from the conveyer rearwardly of the sprockets 19, and to prevent the same from falling upon the apron 43 of the elevator, a baffle plate 52 is disposed above the upper stretch of the apron. The forward end of the baffle plate 52 is disposed below the knife 33, the opposite sides of the baffle plate being bent downwardly as at 53, and the baffle plate extends entirely across the upper face of the elevator, so as to discharge the leaves and stems over the sides of the elevator and prevent the same from passing into the cart 39. The lower extremity of the baffle plate is provided with an upstanding flange 54 to prevent the leaves and stems of the beets from sliding downwardly thereupon over the lower edge thereof on to the apron of the elevator. A seat 55 is mounted upon the central longitudinal bar 6 of the main frame, the seat being disposed in a position adjacent the handle of the lever 16, whereby the operator upon the seat may readily move the lever 16 to raise and lower the plow out of and into engagement with the ground.

From the above description taken in connection with the accompanying drawings, it will be seen that I have provided a beet puller and topper, which will automatically pull the beets from the ground, and top the same and then deliver them into a cart or other suitable receptacle connected to the frame of the device.

What I claim is:

1. A device of the character described comprising a wheeled frame, an auxiliary frame including spaced bars, braces connecting such bars, one of such braces affording a pivotal connection with the wheeled frame, digging means supported by a second of such braces, and a conveying means operatively supported by the auxiliary frame.

2. A device of the character described comprising a wheeled frame including an arched part, an auxiliary frame including spaced bars, braces connecting such bars, one of such braces being provided with ears adapted to project within the arched part of the wheeled frame, means carried by such arched part directed through the ears for pivotally connecting the auxiliary frame to the wheeled frame, digging means supported by a second of such braces, a conveying means carried by the auxiliary frame, and means for adjusting the auxiliary frame about its pivot.

In testimony whereof I hereunto affix my signature in the presence of two witnesses.

DAVID OLSON.

Witnesses:
A. H. SMITH,
EDD GREER.

---

Copies of this patent may be obtained for five cents each, by addressing the "Commissioner of Patents, Washington, D. C."